United States Patent [19]

Nakamura

[11] Patent Number: 5,742,186

[45] Date of Patent: Apr. 21, 1998

[54] ASYNCHRONOUS SERIAL COMMUNICATION CHANNEL NETWORK

[75] Inventor: Akira Nakamura, Kanagawa-ken, Japan

[73] Assignee: Victor Company of Japan, Ltd., Yokohama, Japan

[21] Appl. No.: 622,092

[22] Filed: Mar. 26, 1996

[30]  Foreign Application Priority Data

Apr. 28, 1995 [JP] Japan ................................. 7-129108

[51] Int. Cl.⁶ ..................... H03K 17/16; H03K 19/0175
[52] U.S. Cl. ........................................ 326/90; 326/30
[58] Field of Search ............................. 326/30, 90, 83

[56]  References Cited

U.S. PATENT DOCUMENTS

| | | | |
|---|---|---|---|
| 3,694,665 | 9/1972 | Belluche | 326/90 |
| 5,315,175 | 5/1994 | Langner | 326/90 |
| 5,603,039 | 2/1997 | Strevey | 326/30 |
| 5,604,450 | 2/1997 | Borkar et al. | 326/30 |

*Primary Examiner*—Edward P. Westin
*Assistant Examiner*—Richard Rosen
*Attorney, Agent, or Firm*—Michael N. Meller

[57]  ABSTRACT

The present invention provides the network configuration that enables the random change of slaves to serve as the master without affecting the circuit by an increased or decreased number of connected slaves in an asynchronous serial communication circuit network that connects the slaves, using the dispersion and branch system, with a three-wired circuit consisting of a signal ground wire and two signal lines. Master and slaves are connected to a three-wired circuit by providing both input and output circuits, and the branch devices are provided at the connection section between the aforementioned slaves and a three-wired circuit. Branch devices contain the first, second, and third output circuits consisting the OR circuits and the open collector circuits, as well as the first, second, and third input circuits that form pairs with these first, second, and third output circuits and that have been terminated by being connected to the electrical power by means of terminal resistor; and has a circuit configuration wherein the aforementioned first input circuit is connected with the first input terminal of the OR circuits in the aforementioned second and third output circuits, the first input terminal of the OR circuit in the aforementioned first output circuit and the second input terminal of the OR circuit in the aforementioned second output circuit are connected with the aforementioned third input circuit, and the second input terminal of the OR circuit in the aforementioned first output circuit and the second input terminal of the OR circuit in the aforementioned third output circuit are connected with the aforementioned second input circuit.

5 Claims, 2 Drawing Sheets

ASYNCHRONOUS SERIAL COMMUNICATION CHANNEL NETWORK

BACKGROUND OF THE INVENTION

1. Field of the Invention

The present invention relates to an asynchronous serial communication channel network, particularly a communication channelnetwork wherein slaves are connected to a three-line circuit using the dispersion and branch system.

2. Description of Prior Art

Many diverse Local Area Network (LAND wherein a video editing system and multiple video tape recorders (VTRs), as well as a host computer and multiple terminal computers, are connected via a circuit using a dispersion and branch system have been created.

In this type of LAN, in order to conduct a full duplex unilateral branch type communication using a three-wire circuit which consists of a signal ground wire and two signal lines, a network configuration such as the one shown in FIG. 1 is used by designating a video editing system or a host computer as the master and the VTRs, or the terminal computers, as the slaves.

In FIG. 1, master 50 and slaves 51, 52, and 53 are connected to a three-wired circuit 60 consisting of signal ground (GND) wire 61 and two signal lines 62 and 63. Additionally, signal lines 62 and 63 serve as transmission and reception lines, respectively, with respect to the master 50 side.

Moreover, signal line 62 is directly connected to reception terminals RXS1, RXS2, and RXS3 of slaves 51, 52, and 53. Also, signal line 63 is terminated by being connected to the electrical power Vcc in the area of reception terminal RX0 on the master 50 side by means of terminal resistor Rm. Furthermore, transmission terminals TXS1, TXS2, and TXS3 on slaves 51, 52, and 53 side are connected to signal line 63 via an open collector circuit consisting of NPN-type transistors Trs1, Trs2, and Trs 3.

Subsequently, transmission signals from the master 50 side are directly transmitted to reception terminals RXS1, RXS2, and RXS3 of slaves 51, 52, and 53 via signal line 62. On the other hand, when executing the transmission from the slaves 51, 52, and 53 side to the master 50 side, the voltage level of signal line 63 is changed by slaves 51, 52, and 53 which turn off and on each open collector circuit corresponding to the transmission signals and the master 50 side receives the changes in the voltage level as transmission signals. Slaves 51, 52, and 53 transmit signals via the open collector circuit consisting of transistors Trs1, Trs2, and Trs3 in order to maintain the floating state for the linkage with signal line 63 all the time except for the transmission time.

When a circuit connection request is generated from the master 50 side in this communication circuit network, master 50 outputs the connection request command which includes slave specifying code from transmission terminal TX0 to signal line 62, while slaves 51, 52, and 53 receive the connection request command from RXS1, RXS2, and RXS3.

At that time, the slave that corresponds to the specifying codes outputs the aforementioned specifying codes and response command, that includes ACK signals, to signal line 63 from transmission terminal TXS (TXS1, TXS2, and TXS3), and master 50 receives and verifies the aforementioned signals based on the returned response command, thereby establishing a data link. Subsequently, master 50 and specified slaves exchange text data by adding a header which contains the specifying code for the counterpart device according to the designated transmission control procedure.

On the other hand, when generating a circuit connection request from slaves 51, 52, or 53, the slave outputs the connection request command that contains its own specifying code from transmission terminal TXS to signal line 63 and master 50 receives it from reception terminal RX0. At that time, the slaves transmit the aforementioned specifying codes and response command that includes ACK signals to signal line 62, thereby establishing a data link. Hereafter, as described above, the exchange of text data is executed.

With this communication circuit network, as the circuit connection requests may collide over the circuit, the circuit is controlled using a contention method or a polling/selecting method.

As it is clear from the network configuration in FIG. 1, the communications are available only between master 50 and slaves 51, 52, and 53 since the aforementioned communication circuit network is a unilateral branch system, and slaves 51, 52, and 53 cannot communicate between each other.

Moreover, as the connection circuit of master 50 with a three-wired channel 60 and the connection circuit of slaves 51, 52, and 53 thereof are different, slaves 51, 52, and 53 cannot serve as a master unless the connection circuit is modified.

Moreover, while there is an advantage in that a network configuration with the unilateral branch method may be economically achieved if the transmission distance is long, but the amount of data is small. However, as the capacity and contents of slaves, or the echo of electrical current at the branch section of the circuit, may cause deterioration in the transmission signals, in reality, there is a limitation to the number of slaves that can be connected.

BRIEF SUMMARY OF THE INVENTION

1. Object of the Invention

The purpose of the present invention is to provide a network configuration wherein communication with the full duplex bilateral branch system is enabled between slaves and the increase or decrease in the number of connected slaves does not affect the communication circuit, thereby solving the aforementioned issues in an asynchronous serial communication channel network in which slaves are connected to a three-line circuit using the dispersion and branch system.

2. Brief Summary

Provided, according to an aspect of the present invention, is an asynchronous serial communication channel network, that is connected with a three-wired circuit consisting of a signal ground line and two signal lines using a dispersion and branch system, comprising:

a master that is connected to a three-wired circuit by providing both input and output circuits;

slaves that are connected to a three-wire circuit by providing both input and output circuits; and branch devices that are provided at the connection between said slaves and a three-wire circuit, and comprise the first, second, and third output circuits having the OR circuit and the open collector circuit, and the first, second, and third input circuits that form pairs with the first, second, and third output circuit, respectively and that are terminated by being connected to the electrical power by means of terminal resistors.

Moreover, the branch device has a circuit configuration that:

connects said first input circuit with the first input terminals of the OR circuits in said second and third output circuits;

connects the first input terminal of the OR circuit in said first output circuit, the second input terminal of the OR circuit in said second output circuit and said third input circuit; and connects the second input terminal of the OR circuit in said first output circuit, the second input terminal of the OR circuit in said third output circuit, and said second input circuit.

According to the network configuration of the present invention, signal input and output systems involving the adjacent branch devices themselves, and individual branch device and slaves, are linked with the output circuit consisting of the OR circuit and the open collector circuit and the input circuit that is terminated by being connected to the electrical power via terminal resistor.

The above, and other related objects and features of the invention, will be apparent from reading the following description of the disclosure found in the accompanying drawings and the novelty, thereof, pointed out in the appended claims.

DETAILED DESCRIPTION OF THE INVENTION

Below, an embodiment of the asynchronous serial communication circuit network of the present invention is described in detail by referring to FIGS. 2 and 3.

Figure 1:
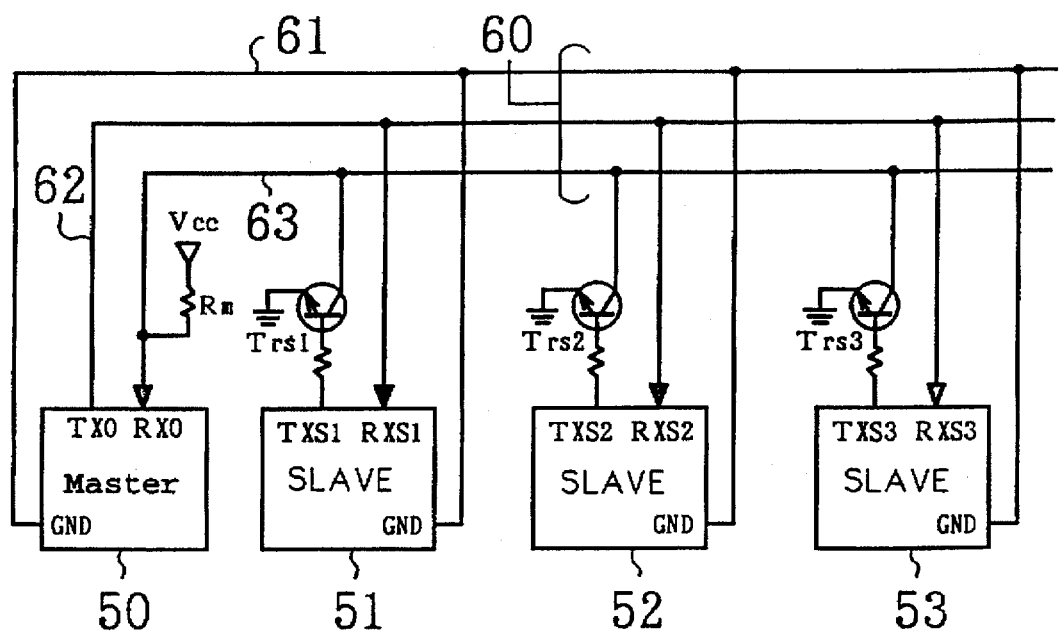
FIG. 1 shows the network configuration of a LAN with a conventional full duplex unilateral branch system.
Figure 2:
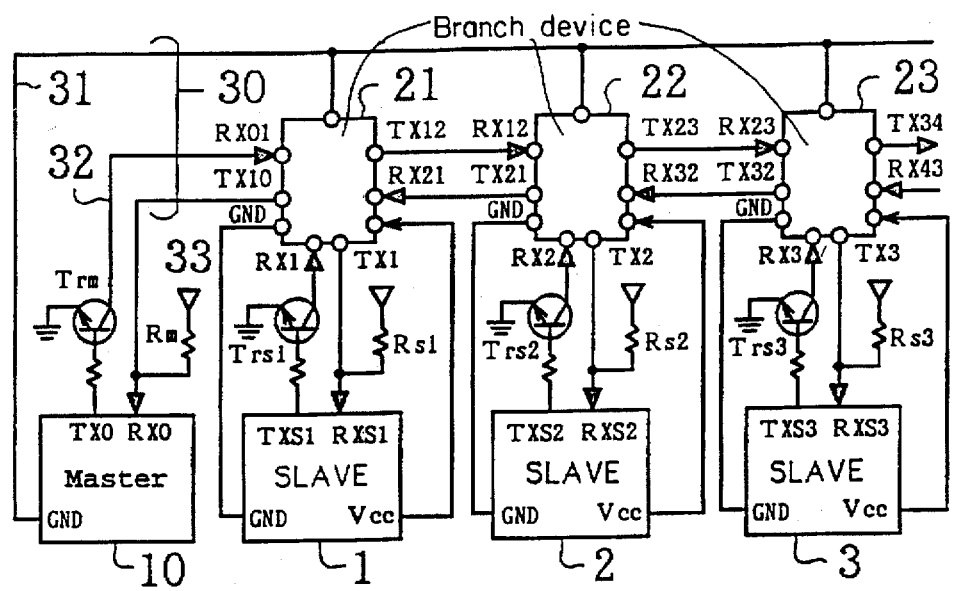
FIG. 2 shows the network configuration involving an embodiment of the asynchronous serial communications network of the present invention.

First, FIG. 2 shows the network configuration relating to the embodiment.

In FIG. 2, master 10, that is provided with both input and output circuits, is connected to a three-lined circuit (hereafter referred to as the "circuit") consisting of a ground (GND) wire 31 and two signal lines 32 and 33. Moreover, branch device 21, 22, and 23 are placed in the path of circuit 30. Then, slaves 1, 2, and 3, that are provided with both input and output circuits similar to the aforementioned, are connected to branch devices 21, 22, and 23. In an entirety, all of these form a network structure with the dispersion branch system.

Moreover, output circuits of the aforementioned master 10 and slaves 1, 2, and 3 are configured by open collector type output circuits using NPN transistors Trm, Trs1, Trs2, and Trs3, whereas the input circuits of the aforementioned master 10 and slaves 1, 2, and 3 are configured by an input circuit that is terminated by being connected to the electrical power Vcc via terminal resistor Pm, Rs1, Rs2, and Rs3, respectively.

Furthermore, the electrical power (Vcc) necessary for the operation of branch devices 21, 22, and 23 is provided from corresponding slaves 1, 2, or 3.

Figure 3:
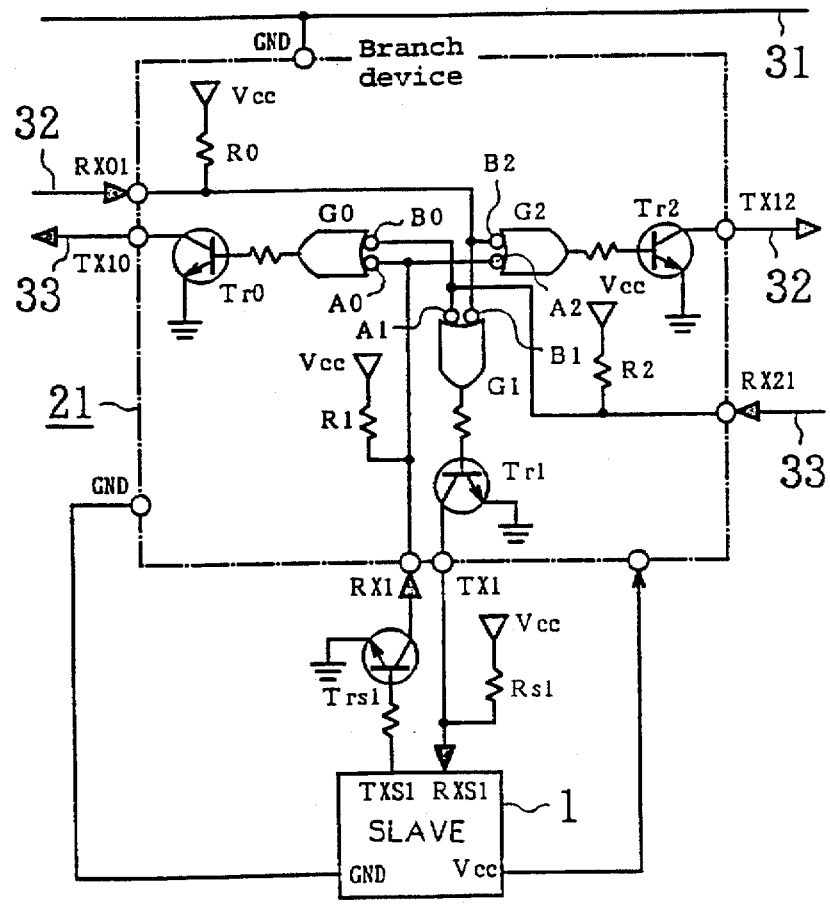
FIG. 3 is an electrical circuit diagram indicating the circuit configuration of the branch device, as well as the linkage between the circuit of the branch device and the slaves, as shown in FIG. 2.

Next, FIG. 3 is an electrical circuit diagram indicating the circuit configuration of branch device 21, as well as the linkage between circuit 30 of the branch device, thereof, and slaves 2 and 3.

The circuit configurations of other branch devices 22 and 23, as well as the linkage between circuit 30 of branch devices 22 and 23 and slaves 2 and 3, are the same.

Here, branch device 21 is positioned between master 10 and branch device 22 on circuit 30; the signal input system connected with signal line 32 involving the signal output system of the master 10 side, the signals input system connected with signal line 33 involving the signal output system of the adjacent branch device 22 side, and the signal input system connected with the signal output system of the slave 1 side, are the input circuits that are terminated by being connected to the electrical power Vcc and pulled up to the H-level by means of terminal resistors R0, R1, and R2, respectively.

Additionally, the signal output system, that is connected with signal line 33 involving the signal input system of the master 10 side, is configured with the output circuit consisting of OR circuit G0 using the double reversal input system, and the open collector circuit wherein the output thereof is connected to the base of NPN type transistor Tr1. Moreover, the signal output system, that is connected with signal line 32 involving the signal input system of adjacent branch device 22 is configured with the output circuit consisting of OR circuit G2 using the double reversal input system, and the open collector circuit wherein the output thereof is connected to the base of NPN-type transistor Tr2.

Furthermore, the signal output system, that is connected with the signal input system of the slave 1 side, is configured with the output circuit consisting of OR circuit G1 using the double reversal input system and the open collector circuit that is connected to the base of NPN-type transistor Tr1.

Reversal input terminal A0 of OR circuit G0 and reversal input terminal A2 of OR circuit G2 are connected to the input circuit (which has been terminated by being connected to the electrical power Vcc by terminal resistor R1) that is connected to the signal output system of the slave 1 side.

Also, reversal input terminal A1 of OR circuit G1 and reversal input terminal B0 of OR circuit G0 are connected to the input circuit (which has been terminated by being connected to the electrical power Vcc by terminal resistor R2) that is connected to signal line 33 involving the signal output system of adjacent branch device 22.

Furthermore, reversal input terminal B1 of OR circuit G1 and reversal input terminal B2 of OR circuit G2 are connected to the input circuit (which has been terminated by being connected to the electrical power Vcc by terminal resistor R0) that is connected to signal line 32 involving the signal output system of the master 10 side.

With the above configuration, branch device 21 operates as follows:

First, when the transmission signals are generated from the master 10 side to signal line 32, the voltage of the input circuit, which has been terminated by being connected to the electrical power Vcc by terminal resistor R0, changes in response to the transmission signals, thereby changing the output of OR circuit G1 and turning on and off transistor Tr1.

Consequently, the voltage of the input circuit of the slave 1 side that has been terminated by being connected to the electrical power Vcc by terminal resistor Rs1 changes in response to the on/off operation of transistor Tr1, thereby enabling slave 1 to receive the transmission signals from the master 10 side.

Moreover, when the transmission signals are generated from other slaves 2 and 3 side, the voltage of the input circuit that has been terminated by being connected to the electrical power Vcc by terminal resistor R2 changes in response to the transmission signals, and the output of OR circuit G1 is changed by the transmission signals, thereby enabling slave 1 to receive the transmission signals from the other slaves 2 and 3 side.

On the other hand, when the transmission signals are generated from slave 1 which is connected to this branch device 21, transistor Trs1 of the output circuit turn on and off in response to the transmission signals, thereby changing the output of OR circuits G0 and G2 to turn on and off transistor Tr1 and Tr2, the transmission signals are then transmitted to the master 10 side via signal line 33 and to the adjacent branch device 22 side via signal line 32, and the transmission signals are received at master 10 and at slave 2.

Additionally, as the branch devices 22 and 23 have a similar circuit configuration with this branch device 21 as described above, the transmission signals may be received at not only master 10 and slave 2, but also at slave 3.

Furthermore, with the network configuration involving this embodiment, full duplex communication is possible at all times as the paths for the transmission system and the reception system are independent from each other with respect to master 10 and slaves 1, 2, and 3.

As it is apparent from the operation of branch device 21 described above, through the network configuration involving the present invention, the communications using the full duplex bilateral branch system becomes possible, thereby freely enabling communications, not only between master 10 and slaves 1, 2, and 3, but also between slaves 1, 2, and 3.

As the connection circuits of master 10 and slaves 1, 2, and 3 with branch devices 21, 22, and 23 are identical, the basic structure on the network configuration does not change even if master 10 is connected with one of branch devices 21, 22, or 23, enabling a change in that the slave can, randomly, become the master.

Because the branch devices 21, 22, and 23 are terminated by being connected to the electrical power Vcc by terminal resistors R1, R2, and R0, an electrical current echo does not occur at the branching points of circuit 30, and, in principle, circuit 30 would not be affected even by increasing or decreasing the number of slaves connected to circuit 30.

In addition, even if the signal logic level is slightly different between master 10 and slaves 1, 2, and 3, the connection is permissible as long as it is within the operable range for branch devices 21, 22, and 23 and it is not necessary to adjust the signal logic slaves by changing the number of connector slaves.

The asynchronous serial communication circuit network of the present invention has the following effectiveness based on the above noted configuration.

(1) In the communication circuit network that connects the slaves with the circuit using the dispersion and branch system, the communication with a full duplex bilateral branch system is accomplished by only connecting the branch devices with simple a circuit configuration.

(2) In principle, the number of connected slaves does not affect the circuit, thereby allowing slaves to be increased regardless of the capacity and contents of the slaves.

(3) The electrical current echo does not occur at the branching points of the circuit, thereby preventing the deterioration of signals and improving the quality of communications.

(4) Master and slaves may be randomly connected without changing the connection circuit to the branch device on the circuit, and the slaves may be freely changed to serve as the master.

(5) It is possible to connect the slaves with differing signal logic levels within the branch device's operable range, thereby increasing the permissible range for slaves that are to be connected and eliminating the need to adjust the signal logic level in accordance with the increased or decreased number of connected slaves.

What is claimed is:

1. An asynchronous serial communication circuit network, that is connected with a three-wire circuit consisting of a signal ground line and two signal lines using a dispersion and branch system, comprising:

a master that is connected to the three-wire circuit by providing both input and output circuits;

slaves that are connected to the three-wire circuit by providing both input and output circuits; and branch devices that are provided at the connection between said slaves and the three-wire circuit, and comprise first, second, and third output circuits having an OR circuit and open collector circuit, and first, second, and third input circuits that form pairs with these first, second, and third output circuits, respectively, and are terminated by being connected to an electrical power by means of a terminal resistor.

2. The asynchronous serial communication circuit network of claim 1, wherein said branch device has a configuration wherein said first input circuit is connected with a first input terminal of the OR circuit in said second and third output circuits, a first input terminal of the OR circuit in said first output circuit and a second input terminal of the OR circuit in said second output circuit are connected with said third input circuit, and a second input terminal of the OR circuit in said first output circuit and a second input terminal of the OR circuit in said third output circuit are connected with said second input circuit.

3. The asynchronous serial communication circuit network of claim 2, wherein the OR circuits in said first, second and third output circuits are configured as such that they comprise the OR circuit with a double reversal input system whereas the open collector circuit comprises NPN-type transistors wherein the output of said OR circuit is connected with the base.

4. The asynchronous serial communication circuit network of claim 1, wherein said master and said slaves have open collector type output circuits.

5. The asynchronous serial communication circuit network of claim 4, wherein the output circuits have an NPN-type transistor.

* * * * *